US006373380B1

(12) United States Patent
Robertson et al.

(10) Patent No.: US 6,373,380 B1
(45) Date of Patent: Apr. 16, 2002

(54) COMMUNICATION METHOD AND SYSTEM FOR CONFIGURING ELECTRIC POWERED VEHICLES

(75) Inventors: Karl Robertson; Thomas Scott, both of Bloomfield Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/694,914

(22) Filed: Oct. 24, 2000

Related U.S. Application Data

(60) Provisional application No. 60/175,360, filed on Jan. 10, 2000.

(51) Int. Cl.[7] .................................................. B60Q 1/00
(52) U.S. Cl. ............... 340/425.5; 340/426; 340/825.31; 340/825.69; 340/825.72; 320/109; 701/49
(58) Field of Search ................................... 340/426, 539, 340/425.5, 825.69, 825.72, 825.31, 5.72, 5.64, 5.22–5.25, 825.49; 307/10.4, 10.5; 701/36, 49

(56) References Cited

U.S. PATENT DOCUMENTS

| 4,453,161 A | * | 6/1984 | Lemelson ............... 340/825.31 |
| 4,754,255 A | * | 6/1988 | Sanders et al. ............. 340/426 |
| 5,506,905 A | * | 4/1996 | Markowski et al. ........ 340/426 |
| 5,548,200 A | * | 8/1996 | Nor et al. .................... 320/27 |
| 5,838,251 A | * | 11/1998 | Brinkmeyer et al. ... 340/825.31 |
| 6,061,558 A | * | 5/2000 | Kennedy, III et al. ...... 455/411 |
| 6,166,652 A | * | 12/2000 | Benvenuti ............. 340/825.49 |
| 6,177,879 B1 | * | 1/2001 | Kokubu et al. ........ 340/825.53 |
| 6,181,991 B1 | * | 1/2001 | Kondo et al. ................. 701/22 |
| 6,184,656 B1 | * | 2/2001 | Karunasiri et al. ......... 320/119 |

* cited by examiner

*Primary Examiner*—Edward Lefkowitz
*Assistant Examiner*—Davetta W. Goins
(74) *Attorney, Agent, or Firm*—Damian Porcari; William J. Coughlin

(57) ABSTRACT

A method for configuring features of an electric powered vehicle to a profile of a random user includes storing a profile of a user on a device possessed by the user. The profile is indicative of how the features of the electric powered vehicle are to be configured. The profile of the user is then transmitted to the vehicle using a radio frequency (RF) transmission link. The features of the vehicle are then configured in accordance with the profile of the user upon receiving the profile of the user. An alternative method for communicating data between a user and the vehicle includes connecting the vehicle to an electric power supply using a hard wired connection. Electrical power from the power supply is then supplied to the vehicle using a power signal through the connection. A carrier signal is then multiplexed on the power signal as the electrical power is being supplied from the electric power supply to the vehicle. A data signal is then transmitted on the carrier signal to communicate data between the vehicle and the electric power supply.

4 Claims, 1 Drawing Sheet

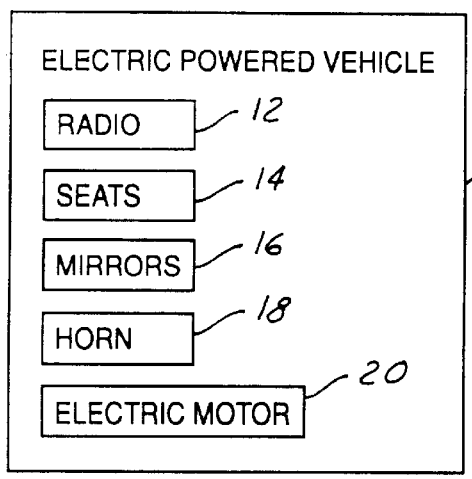
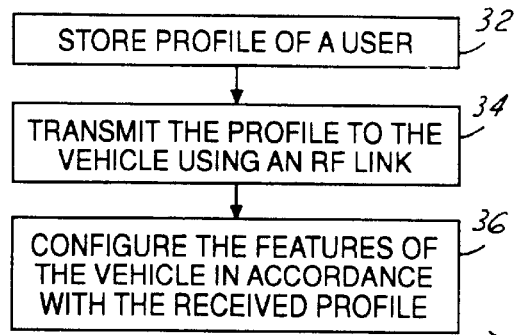
FIG. 1
FIG. 2
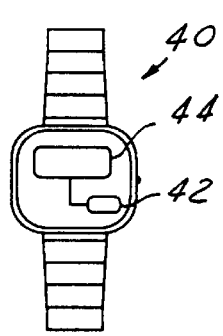
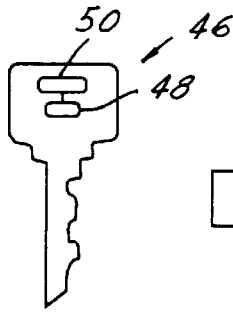
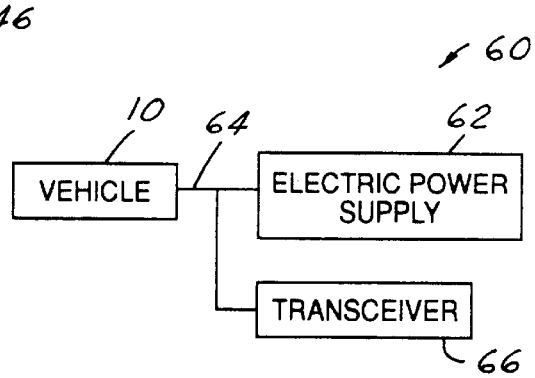
FIG. 3A   FIG. 3B   FIG. 4
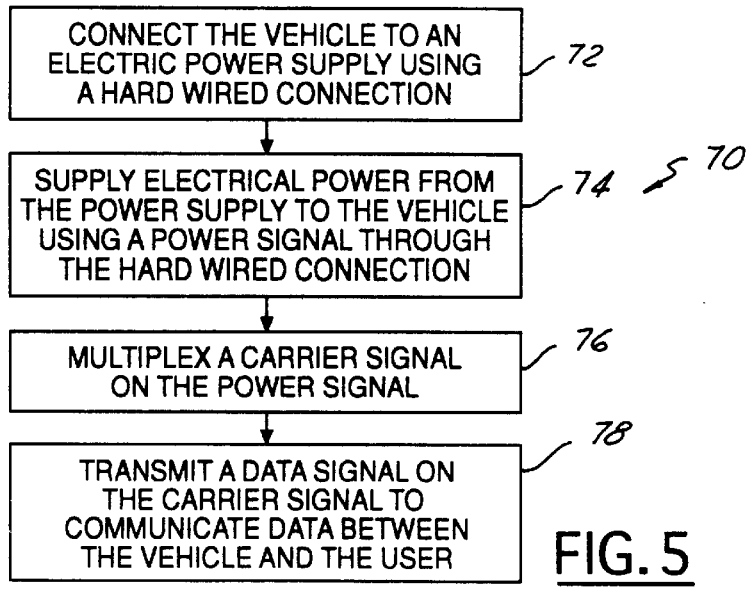
FIG. 5

COMMUNICATION METHOD AND SYSTEM FOR CONFIGURING ELECTRIC POWERED VEHICLES

CROSS-REFERENCE TO RELATED APPLICATIONS

This application claims the benefit of U.S. provisional application Ser. No. 60/175,360, filed Jan. 10, 2000.

TECHNICAL FIELD

The present invention relates generally to communicating information between a user and an electric powered vehicle.

BACKGROUND ART

Electric powered vehicles run on electrical energy stored in onboard batteries and fuel cells. Battery and fuel cell technology currently provides the most promising future alternative to the internal combustion engine. In operation, the vehicles run on the energy stored in the battery and may keep running until no more energy is left in the battery. The battery must then be recharged with more energy until the battery is fully charged. For instance, the battery for use with the vehicle in accordance with the present invention provides enough energy to enable the vehicle to travel fifty miles at a top vehicle speed such as 25 miles per hour.

Electric powered vehicles are especially useful for commuting within closed communities and work environments because of their range and speed. These vehicles provide users with mobility within a relatively small geographic area. Such small geographic areas include planned communities, resorts, industrial complexes, airports, golf courses, and the like.

Operators of such geographic areas may desire to have a fleet of electric powered vehicles for use by users. For instance, a resort operator may desire to have electric powered vehicles scattered around the resort complex for guests to use. Similarly, a golf course operator may desire to have electric powered vehicles lined up for use by golfers. To provide the highest possible service to their guests and users, the operators may desire the electric powered vehicles to be configured to the requirements of their guests. The operators may also want to monitor the usage of the vehicles by the users. Accordingly, what is needed is a method for configuring an electric powered vehicle to the profile of a random user and monitoring the usage of the vehicle by the user.

Further, in operation, an electric powered vehicle is connected to an electrical power supply to charge the battery. Electrical energy flows from the electrical power supply to the battery through the connection such as a hard wire connection. While recharging the vehicle the user may desire to communicate data with the vehicle to further ready the vehicle for use for the next driving session or to receive information regarding the use of the vehicle during the previous driving session. Preferably, the communication of data between the user and the electric powered vehicle should be able to be performed simultaneously with the recharging of the vehicle. Further, the data communication should be performed through the power connection to minimize the amount of effort required by the user for communicating with the vehicle. Accordingly, what is needed is a method for communicating data with the electric powered vehicle as the electric powered vehicle is being recharged.

DISCLOSURE OF INVENTION

Accordingly, it is an object of the present invention to provide a method and system for communicating information between a user and an electric powered vehicle.

In accordance with the above object and other objects, the present invention provides a method for configuring features of an electric powered vehicle to a profile of a random user. The method includes storing a profile of a user on a device possessed by the user. The profile is indicative of how the features of the electric powered vehicle are to be configured. The profile of the user on the device is then transmitted to the electric powered vehicle using a radio frequency (RF) transmission link. The features of the electric powered vehicle are then configured in accordance with the profile of the user upon the vehicle receiving the profile of the user.

Further, in accordance with the above object and other objects, the present invention provides a method for communicating data between a user and an electric powered vehicle as the electric powered vehicle is being recharged. The method includes connecting the electric powered vehicle to an electric power supply using a hard wired connection. Electrical power from the electric power supply is then supplied to the electric powered vehicle using a power signal through the hard wire connection. A carrier signal is then multiplexed on the power signal as the electrical power is being supplied from the electric power supply to the electric powered vehicle. A data signal is then transmitted on the carrier signal to communicate data between the electric powered vehicle and the electric power supply.

BRIEF DESCRIPTION OF DRAWINGS

The present invention will now be described in further detail, and by way of example, with reference to the accompanying drawings, in which:

FIG. 1 illustrates an electric powered vehicle for use with the present invention;

FIG. 2 illustrates a flowchart describing operation of a method for configuring an electric powered vehicle to the profile of a random user in accordance with the present invention;

FIGS. 3a and 3b illustrate transmitting devices to be used with the method in accordance with the present invention;

FIG. 4 illustrates a system for communicating data between a user and an electric powered vehicle in accordance with an alternative method of the present invention; and FIG. 5 illustrates a flowchart describing operation of the alternative method and system.

BEST MODE FOR CARRYING OUT THE INVENTION

Referring now to FIGS. 1, 2a, 2b, and 3, a method for configuring an electric powered vehicle to the profile of a random user and monitoring the usage of the vehicle by the user in accordance with the present invention will be described. FIG. 1 illustrates an electric powered vehicle for use with the present invention. FIG. 2 is a flowchart illustrating operation of the method of the present invention. FIGS. 3a and 3b illustrate transmitting devices to be used with the method of the present invention.

Referring now to FIG. 1, an electric powered vehicle 10 in accordance with the method of the present invention is shown. Vehicle 10 is a standard vehicle that includes a plurality of configurable features. Vehicle 10 includes a radio 12, seats 14, mirrors 16, a horn 18, an electric motor 20, and the like. Each of these features may be adjusted to fit a custom profile of a random user. For instance, radio 12 can be set to one of a plurality of radio stations. Seats 14 may be moved back and forth and up and down to a desired position. Mirrors 16 may be pointed to a desired position. Horn 18 may be configured to play a custom sound. The custom sound may include a friendly horn sound so that pedestrians are not alarmed upon hearing the sound and may also recognize the user of the vehicle from the custom horn sound. Motor 20 may be adjusted to provide different vehicle speeds such as a low golf course speed or a higher road speed.

Referring now to FIG. 2, a flowchart 30 describing operation of the method for configuring features of an electric powered vehicle to a profile of a random user in accordance with the present invention is shown. The method is preferably for use with a fleet of standard non-personal electric powered vehicles having a plurality of configurable features. By configuring the features of a standard vehicle, the vehicle becomes a customized vehicle for each user that uses the vehicle.

Flowchart 30 begins with block 32 storing a profile of a user on a device possessed by the user. The profile is indicative of how the features of the electric powered vehicle are to be configured for the user. Block 34 then transmits the profile of the user on the device to the electric powered vehicle using a radio frequency (RF) transmission link. The RF transmission link enables wireless connection so that the profile may be transmitted from the user to the vehicle while the user is away from the vehicle. Block 36 then configures the features of the electric powered vehicle in accordance with the profile of the user upon receiving the profile of the user.

Referring now to FIGS. 3a and 3b, embodiments of the device for transmitting the profile of the user to the vehicle is shown. FIG. 3a illustrates a wrist watch 40 having a transmitter 42. Wrist watch 40 is intended to be worn by the user. Wrist watch 40 further includes a proximity switch 44. When enabled, proximity switch 44 detects the distance between user and the vehicle. When the distance falls within a certain range, proximity switch 44 enables transmitter 42 to transmit the custom profile to the vehicle. Preferably, proximity switch 44 enables transmitter 42 when the user is within a certain distance of vehicle 10. FIG. 3b illustrates a key 46. Key 46 also includes a transmitter 48 and a proximity detector 50 and functions similarly to wrist watch 40.

Either of the devices 40 and 46 may by physically enabled to transmit the custom profile to the vehicle. The physical enablement includes manually activating buttons and the like on the devices. The physical enablement also includes issuing a voice command to the devices. In an alternate embodiment, a voice command identifier is located on the vehicle.

Referring now to FIG. 4, a system 60 for communicating data between a user and an electric powered vehicle as the electric powered vehicle is being recharged in accordance with another method of the present invention is illustrated. System 60 includes an electric power supply 62 for supplying electric power to vehicle 10 using a power signal. A hard wire connection 64 connects electric power supply to vehicle 10 to supply the power signal from power supply 62 to the vehicle. A transceiver 66 multiplexes a carrier signal on the power signal as the electrical power is being supplied from power supply 62 to vehicle 10. Transceiver 66 transmits a data signal on the carrier signal to communicate data between vehicle 10 and power supply 62. The data may include usage information, maintenance information, personal profiles for features such as those described above, and any other information to ready the vehicle for use in the next driving session or any information regarding the use of the vehicle during the previous driving session.

Referring now to FIG. 5, a flowchart 70 describing operation of the alternative method and system 60 is illustrated. Flowchart 70 begins with block 72 connecting the electric powered vehicle to an electric power supply using a hard wired connection. Block 74 then supplies electrical power from the electric power supply to the electric powered vehicle using a power signal through the hard wire connection. Block 76 then multiplexes a carrier signal on the power signal as the electrical power is being supplied from the electric power supply to the electric powered vehicle. Block 78 then transmits a data signal on the carrier signal to communicate data between the electric powered vehicle and the electric power supply.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for communicating user profile data between a user and an electric powered vehicle as the electric powered vehicle is being recharged, the method comprising:

connecting the electric powered vehicle to an electric power supply using a hard wire connection;

supplying electrical power from the electric power supply to the electric powered vehicle using a power signal through the hard wire connection;

multiplexing a carrier signal on the power signal as the electrical power is being supplied from the electric power supply to the electric powered vehicle;

transmitting a user profile data signal on the carrier signal to communicate user profile data between the electric powered vehicle and the user via the electric power supply, wherein the user profile data is indicative of how features of the electric powered vehicle are to be configured for the user; and configuring features of the electric powered vehicle in accordance with the user profile data upon the electric powered vehicle receiving the user profile data signal.

2. The method of claim 1 wherein:

the hard wire connection includes a standard interface electrical plug connected to the electrical power supply.

3. The method of claim 1 wherein:

the electrical power supply is a standard household electrical power supply.

4. A system for communicating user profile data between a user and an electric powered vehicle as the electric powered vehicle is being recharged, the system comprising:

an electric power supply for supplying electric power to the electric powered vehicle using a power signal;

a hard wire connection for connecting the electric power supply to the electric powered vehicle to supply the power signal from the electric power supply to the electric powered vehicle; and a transceiver for multiplexing a carrier signal on the power signal as the electrical power is being supplied from the electric power supply to the electric powered vehicle, the transceiver further operable for transmitting a user profile data signal on the carrier signal to communicate user profile data between the electric powered vehicle and the user via the electric power supply, wherein the user profile data is indicative of how features of the electric powered vehicle are to be configured for the user.

* * * * *